United States Patent
Verrat et al.

(10) Patent No.: US 9,289,944 B2
(45) Date of Patent: Mar. 22, 2016

(54) METHOD FOR FIXING AN ATTACHED COMPONENT TO A GLAZING OR TO A MOLDING, FIXING DEVICE FOR FIXING THE COMPONENT AND GLAZING OBTAINED USING THE METHOD

(75) Inventors: Adele Verrat, Villers-sur-Coudun (FR); Loic Froissard, Choisy Au Bac (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 412 days.

(21) Appl. No.: 13/499,803

(22) PCT Filed: Oct. 1, 2010

(86) PCT No.: PCT/FR2010/052080
§ 371 (c)(1),
(2), (4) Date: May 31, 2012

(87) PCT Pub. No.: WO2011/039490
PCT Pub. Date: Apr. 7, 2011

(65) Prior Publication Data
US 2012/0237724 A1    Sep. 20, 2012

(30) Foreign Application Priority Data

Oct. 1, 2009 (FR) ...................... 09 56852

(51) Int. Cl.
*B32B 3/24* (2006.01)
*B29C 65/60* (2006.01)
(Continued)

(52) U.S. Cl.
CPC ............ *B29C 65/606* (2013.01); *B29C 65/08* (2013.01); *B29C 65/607* (2013.01);
(Continued)

(58) Field of Classification Search
CPC ....... B29C 65/08; B60J 10/02; B60J 10/0051; B60R 13/06; B60R 13/04; Y10T 428/24339; Y10T 428/24347
USPC ........................................................ 428/132
See application file for complete search history.

(56) References Cited

U.S. PATENT DOCUMENTS

| 3,367,809 A | 2/1968 | Soloff |
| 5,142,834 A | 9/1992 | Laclave et al. |

(Continued)

FOREIGN PATENT DOCUMENTS

| DE | 28 36 016 | 3/1980 |
| DE | 100 25 359 C1 | 10/2001 |

(Continued)

OTHER PUBLICATIONS

International Search Report issued Mar. 17, 2011 in Application No. PCT/FR2010/052080.

(Continued)

*Primary Examiner* — William P Watkins, III
(74) *Attorney, Agent, or Firm* — Oblon, McClelland, Maier & Neustadt, L.L.P.

(57) ABSTRACT

A method for fixing an attached component made of plastic, such as a trim, to a periphery of a glazing or to a portion of a molding fixed to the periphery of the glazing. The attached component includes a rear face including a fixing mechanism fixing it to the glazing or to the molding. The rear face includes appendages each of which enters a hole created in the molding or in the glazing and which is open at its two ends onto two opposite faces of the molding or glazing respectively. The distal end of each appendage projects beyond a rear face of, respectively, the molding or glazing delimiting the hole, and the distal end of each appendage is deformed by temporary softening, for example through application of ultrasound, to come into contact with the rear face of the molding or glazing at the periphery of the hole or around the entire periphery of the hole.

15 Claims, 5 Drawing Sheets

(51) Int. Cl.
  B29C 65/08 (2006.01)
  B29C 65/64 (2006.01)
  B29C 65/00 (2006.01)
  B60J 10/00 (2006.01)
  B60J 10/02 (2006.01)
  B60R 13/04 (2006.01)
  B60R 13/06 (2006.01)
  B29C 65/18 (2006.01)
  B29K 309/08 (2006.01)
  B29L 31/00 (2006.01)

(52) U.S. Cl.
  CPC .......... B29C 65/645 (2013.01); B29C 66/7392 (2013.01); B29C 66/73152 (2013.01); B29C 66/7465 (2013.01); B29C 66/81429 (2013.01); B29C 66/8322 (2013.01); B60J 10/0051 (2013.01); B60J 10/02 (2013.01); B60R 13/04 (2013.01); B60R 13/06 (2013.01); B29C 65/18 (2013.01); B29C 66/45 (2013.01); B29C 66/7394 (2013.01); B29C 66/81422 (2013.01); B29C 66/81423 (2013.01); B29C 66/919 (2013.01); B29C 66/9161 (2013.01); B29C 66/9241 (2013.01); B29C 66/949 (2013.01); B29K 2309/08 (2013.01); B29K 2995/007 (2013.01); B29L 2031/737 (2013.01); B29L 2031/778 (2013.01); Y10T 428/24331 (2015.01); Y10T 428/24339 (2015.01); Y10T 428/24347 (2015.01)

(56) References Cited

U.S. PATENT DOCUMENTS

| | | | |
|---|---|---|---|
| 6,103,998 | A | 8/2000 | Kuno et al. |
| 6,455,809 | B1 | 9/2002 | Kuno et al. |
| 2010/0011670 | A1 | 1/2010 | O'Sullivan et al. |

FOREIGN PATENT DOCUMENTS

| | | | |
|---|---|---|---|
| DE | 10 2006 022 929 A1 | | 11/2007 |
| EP | 1 944 182 A1 | | 7/2008 |
| JP | 62-71623 | | 4/1987 |
| JP | 6-92142 A | | 4/1994 |
| JP | 10-329613 | | 12/1998 |
| JP | 11-58518 | | 3/1999 |
| JP | 2003-118386 | | 4/2003 |
| JP | 2003118386 A | * | 4/2003 |

OTHER PUBLICATIONS

Office Action issued Aug. 19, 2014, in Japanese Patent Application No. 2012-531487 with English translation.

* cited by examiner

//\# METHOD FOR FIXING AN ATTACHED COMPONENT TO A GLAZING OR TO A MOLDING, FIXING DEVICE FOR FIXING THE COMPONENT AND GLAZING OBTAINED USING THE METHOD

CROSS-REFERENCE TO PRIORITY APPLICATIONS

The present application is the U.S. counterpart of WO 11/039490 and claims priority to French application no. 0956852 filed on Oct. 1, 2009, the entire contents of each of which are hereby incorporated by reference.

TECHNICAL FIELD

The present invention relates to the field of the production of moldings on glazings.

It relates more specifically to the fixing of an attached component made of plastic, such as a trim, to the periphery of a glazing.

The present invention thus relates to a method for fixing an attached component made of plastic, such as a trim, to the periphery of a glazing and in particular to a portion of a molding fixed to the periphery of the glazing, said attached component having a rear face comprising fixing means for fixing it to said glazing or to said molding.

BACKGROUND

A system for clipping a profiled trim element onto a molding using a flexible clip for fixing an attached component to a glazing is known in the prior art from International Patent Application WO 2007/003823.

According to that document, the upstream collaborating part comprises at least one projecting male element or one hollow female element, this element collaborating respectively with a corresponding hollow female element or projecting male element created in the molding, said hollow female element having interior dimensions that are at least partially smaller than the exterior dimensions of said projecting male element.

This collaboration is thus of the "tenon-mortise" type with friction between at least part of the surfaces of the elements.

One important advantage of this device lies in the reliability of the fixing system: it allows the profiled trim to be held reliably in position even under extreme, notably vibrational, conditions.

However, this system makes the design of the molding far more complicated and necessitates the designing of a special molding that has special male or female zones.

In particular, this system dictates that the clip has to be positioned extremely precisely so that the upstream collaborating part collaborates correctly with the corresponding part created in the molding, and such precise positioning is difficult to automate (it can be done only by hand), leading to additional costs when this solution is implemented.

A system for fixing a trim directly to a molding with no immediate component is also known in the prior art, from International Patent Application WO 2008/084076, and this fixing is performed by an appendage of barbed appearance situated on the rear face of the trim piercing the molding.

In order to fix the trim onto the molding, it is therefore necessary for the trim to be positioned precisely with respect to the molding and for the (decorative) exterior face of the trim to be pressed hard enough for the barbed hook to pass through the molding.

However, because the material of the molding performs a sealing function, it has to have a fairly high mechanical strength and the pressure force needed to achieve the piercing has therefore to be very high.

This system is complicated to implement because the force with which the trim has to be pressed against the molding has to be high but at the same time precise so that the barbed hook correctly penetrates the molding, without crumpling under the effect of the pressing force. It too is very difficult to automate.

Further, it is difficult to implement without running the risk of damaging the (decorative) front face of the trim.

SUMMARY

It is an object of the invention to alleviate the disadvantages of the prior art by proposing a system for fixing an attached component, such as a trim, to a molding or directly to a glazing, which does not require extremely precise positioning of the trim with respect to the molding or to the glazing when the trim is being fixed and which can be automated, that is to say that the entire trim can be fitted in a single industrial operation, using a single robot.

One essential objective being pursued is thus that of providing a workstation which is able, in a single operation, to fix the (or all of the) attached component(s) which is (are) to be fixed to at least one glazing, or even to several glazings at once.

This solution according to the invention is also simple to implement while at the same time being reliable (the trim cannot readily be removed once it has been fitted).

The following is a method for fixing an attached component made of plastic, such as a trim, to the periphery of a glazing (the case of plastic glazings or pierced glass glazings) and in particular to a portion of a molding fixed to the periphery of the glazing, said attached component having a rear face comprising fixing means for fixing it to said glazing or to said molding. The rear face comprises several appendages each of which enters a hole created in said molding or in said glazing and which is open at its two ends onto two opposite faces of said molding or of said glazing (a front face and a rear face of the attached component) respectively, the distal end of each appendage (i.e. the end of the appendage that is at the opposite end to the end for connecting to the rear face) projecting beyond a rear face of, respectively, said molding or said glazing delimiting the hole (and more specifically at least part of the periphery of the hole) and said distal end of each appendage is deformed by temporary softening, preferably through the application of ultrasound, to come into contact with said rear face of said molding or of said glazing at the periphery of the hole and preferably around the entire periphery of the hole.

The idea of front/rear as used here refers not to the direction of forward travel of a vehicle fitted with the glazing according to the invention but is to be understood as meaning with reference to the bodywork of the vehicle: a front face denotes a face oriented toward the outside of the vehicle and a rear face denotes a face oriented toward the inside of the vehicle.

According to the invention, during the softening of the distal end of the appendage, the element (molding or glazing itself) situated between this distal end and the end via which the appendage is connected to the attached component is sandwiched and immobilized between the softened distal end and the rear face of the attached component.

This softening is such that the distal end of the appendage which has been passed through the hole previously created in the element (molding or glazing itself) leads to deformation such that this distal end can no longer fit back through the hole: its exterior section becomes greater than the interior section of the hole.

The softening is then, of course, followed by a hardening of the material of the appendage after the source of softening has been removed, and the distal end then finds itself set in its deformed shape.

When the attached component is fixed directly to the molding, during this softening, the hard plastic of the attached component thus sandwiches the soft plastic of the molding between the rear face of the attached component and the softened distal end of the appendage. This action, once the deformed distal end has hardened, causes the molding to be compressed and reduces the risk of any play arising between the attached component and the molding; indeed, such play is detrimental because it can cause the attached component to begin to quiver under the effect of certain vibrations, and that is unacceptable to the esthetic look of the glazing and of the vehicle comprising the glazing.

In general, it is considered here that the soft plastics are those which, after working, have a hardness of 110 Shore A or below (generally in a range of 50 to 110 Shore A inclusive of these values), such as TPE, PVC, PU, EPDM, etc., for example; hard plastics are those which, after working, have a hardness in excess of 110 Shore A, or a hardness contained in a range from 30 to 100 Shore D inclusive of these values, such as PC, ABS, ABS-PC, etc., for example.

The appendage is fixed to said rear face of the attached component; it is unable to move with respect to this attached component; it merely decreases in length and experiences an increase in the exterior section of its distal end during the softening. The appendage is formed as one with the attached component: it is manufactured at the same time as the attached component (for example by molding) or is fixed very securely to the attached component.

The appendage is of elongate shape and thus has two ends along its length. It is manufactured at the same time as the attached component, notably when the latter has been manufactured by molding, or is fixed to the interior face of the attached component, for example by welding or bonding.

One end of the appendage, the proximal end, is thus connected to the interior face of the attached component. The end known as the "distal end" in the context of the invention is that end of the appendage that is distant from the interior face of the attached component and is not connected to the interior face of the attached component.

The distal end of the appendage means any part of the appendage which projects beyond the hole created in the molding or in the glazing itself and in which the appendage is partially concealed.

According to the invention, after softening and then hardening, each appendage of the attached component finds itself under slight internal tensile stress between the headed distal end and the rear face of the attached component.

The softening of the distal end of the appendage is preferably performed by applying ultrasound in the frequency range from 25 to 70 kHz, and more preferably still in the frequency range from 30 to 35 kHz.

However, it is also possible for the softening of the distal end of the appendage to be brought about by heating by thermal conduction using a source of heat, such as a metal rod for example at a temperature of about 150 to 200° C.

In a particular variant of the method, mechanical pressure is applied to said distal end, at least during part of the softening time, and preferably throughout the softening time, or even for a longer period (and, in particular, the pressure may be maintained for a duration of 1 to 10 seconds after the source of softening has been removed; it potentially being possible for this mechanical pressure to give rise to a flattening of the distal end of the appendage).

In a very specific variant of the method, the distal end of several appendages (and preferably of all the appendages of the attached component) are deformed simultaneously by temporary softening (more preferably still by the application of ultrasound), to come into contact at the same time with a rear face of said molding or of said glazing at the periphery of the hole (and preferably over the entire periphery of the hole).

The present invention also relates to a device for implementing the method according to the invention, comprising at least one source of softening and, in particular, at least one source of ultrasound and preferably comprising several sources of softening that can be implemented simultaneously.

The present invention thus also relates to the use of a source of softening and notably of at least one source of ultrasound, or even to the use of several sources of softening implemented simultaneously, to implement the method according to the invention.

The present invention further relates to a glazing, particularly obtained by the method according to the invention, comprising an attached component made of plastic, such as a trim, which is fixed to the periphery of a glazing and which in particular is fixed to a portion of a molding which is itself fixed to the periphery of the glazing, said attached component having a rear face comprising fixing means for fixing it to said glazing or to said molding. Said rear face of the attached component comprises several appendages each of which enters a hole created in said glazing or in said molding and which is open at its two ends onto two opposite faces of said glazing or of said molding, the distal end of said appendage projecting beyond a rear face of said glazing or said molding delimiting the hole and in that said distal end of each appendage has been deformed by softening, preferably through the application of ultrasound, to come into contact with said rear face of said glazing or of said molding at the periphery of the hole and preferably around the entire periphery of the hole.

The fact that the distal end has been deformed by softening can be determined for certain simply by looking at the glazing because the distal end thus deformed cannot penetrate the hole and because no trace of purely mechanical deformation (such as a point or fold line for example) is visible; furthermore, deformation by softening preferably leads to a change in the surface appearance of the distal end, with the appearance of blistering and/or a change in color.

The attached plastic component is preferably fixed to the periphery of a glazing only by the appendages according to the invention.

According to a variant of the invention, several holes (and preferably all the holes through which an appendage passes) are oriented along axes A, A' that are parallel in space.

According to a variant of the invention, several appendages (and preferably all the appendages of the attached component) are oriented along axes B, B' that are parallel in space. The element that comprises the holes (molding or glazing), if manufactured by molding, is then easy to release from the mold.

In a variant of the invention, several appendages (and preferably all the appendages of the attached component) are each oriented along axes B that are substantially perpendicular to said rear face of said attached component.

In another variant of the invention, said attached component has a non-flat shape with an angle $\alpha$ between an axis B of an appendage and the rear face of said attached component at the point on the appendage that differs from the angle $\alpha'$ between an axis B' of another appendage and the rear face of said attached component at the location of this other appendage.

According to a variant of the invention, one (and preferably each) appendage has a preferably hollow cross section and a circular, oval, rectangular or square exterior section and said (and preferably each) hole has an interior section of a shape respectively identical to that of the exterior section of said appendage.

According to a variant of the invention, the interior section of the (and preferably each) hole at least at its distal end is substantially identical to (or even slightly smaller than, in the case of a hole made in the molding) the exterior section of said appendage near this end, or even over a portion measuring several millimeters, and for preference the interior section of the (and preferably each) hole is substantially identical to (or even slightly smaller than, in the case of a hole made in the molding) the exterior section of said appendage over the entire depth of said hole.

According to a variant of the invention, said front face of said molding or of said glazing is substantially parallel to said rear face of said attached component, at least at the periphery of the (and preferably each) hole. It is then possible to apply the rear face of the attached component against the front face of the molding or of the glazing and the main part of the attached component thus finds itself applied respectively against the molding or the glazing under the effect of the internal tensile stresses in the appendages.

According to a variant of the invention, said rear face of said molding or of said glazing at the location of the hole is perpendicular to the axis of the hole, or even to the axis of the appendage.

According to a variant of the invention, said attached component has an elongate shape and for preference said appendage has an elongate section extending in the elongate direction of said attached component.

According to a variant of the invention, the distal end of the (and preferably each) hole comprises, over at least part of its periphery (and preferably over its entire periphery), a boss projecting with respect to the rear face of said glazing or of said molding at the periphery of the hole.

According to a variant of the invention, the distal end of the (and preferably each) hole comprises, over at least part of its periphery (and preferably over its entire periphery), a depression set back from the rear face of said glazing or of said molding at the periphery of the hole.

One important advantage of the invention lies in the fact that there is no need to position the attached component with respect to the molding or the glazing itself (if it is positioned directly through the glazing) with great precision; the attached component is naturally guided toward the molding or the glazing as the appendages gradually penetrate the associated holes.

Another important advantage of the invention lies in the fact that the fixing thus achieved is very reliable while at the same time being simple to perform: it is readily repeatable, easy to automate (in full or in part) while at the same time allowing the attached component to be held firmly in position with respect to the molding or the glazing itself. It is far easier to have an appendage enter an existing hole than to try to get a barbed hook to pierce the material of the molding as proposed in patent application WO 2008/084076.

Furthermore, this fixing is very tolerant of vibrations: any vibrations that reach the molding and the glazing can have no effect on the fixing of the attached component and cannot in any way degrade the connection between the molding (or the glazing itself) and the attached component.

Furthermore, even though the connection between the molding (or the glazing itself) and the attached component is a reliable one, it is easy to destroy for the purposes of recycling the glazing: once the glazing has been detached from the bodywork, it is easy once again temporarily to soften the distal end in order to remove the attached component.

All of these advantages are of particular benefit when the attached component is fixed to the periphery of the glazing only by the appendages, without any other mechanical means of attachment or any other chemical means (adhesive) of attachment.

Advantageously, the system according to the invention allows at least one intermediate component to be fixed to a molding or to a glazing without this molding having any special complex shape to suit the attached component, which shape might be difficult to design and to produce (particularly by molding) because of this specific feature and without there being any need for some intermediate component between, on the one hand, the attached component and, on the other hand, the molding or the glazing.

BRIEF DESCRIPTION OF THE DRAWINGS

The present invention will be better understood from reading the detailed description that follows of some nonlimiting exemplary embodiments and from studying the attached figures.

DETAILED DESCRIPTION

To make these figures easier to understand, they have not been drawn strictly to scale and elements appearing in the background have generally not been depicted.

The present invention relates to the fitting and fixing of an attached component 2, such as a trim, at the periphery of a glazing 1, particularly a vehicle glazing.

According to the invention, there are two possible ways of fixing the attached component to the glazing:

scenario C, the attached component is fixed directly to a glazed element 5 of the glazing 1, scenario D, the attached component is fixed indirectly to the glazing 1, via a molding 3.

Figure 1:
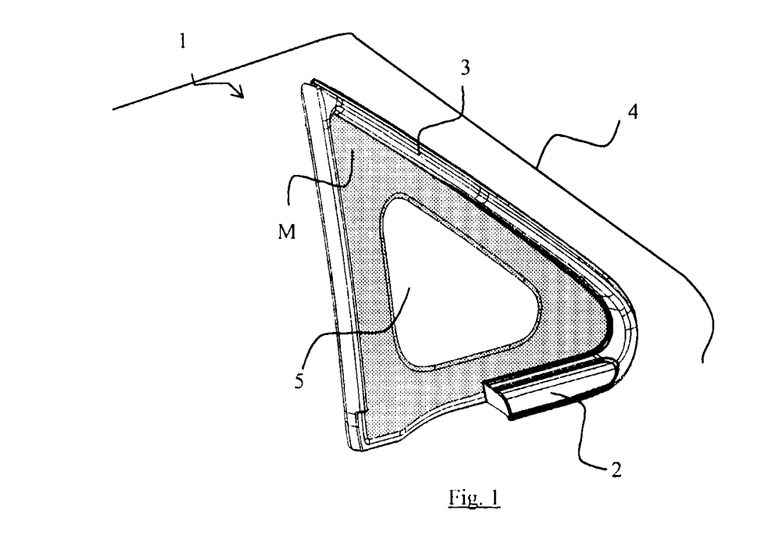
FIG. 1 illustrates a perspective view of a vehicle rear left fixed glazing having a trim fixed to the molding, the trim and the molding being illustrated in cross section at the bottom front part of the glazing.

FIG. 1 illustrates a rear end of a motor vehicle equipped with a glazing 1 fixed to the bodywork 4 of the vehicle and on the periphery of which a molding 3 made of a plastic that is a flexible plastic within the meaning of the invention has been produced.

The polymer of which the molding 3 is made may be a thermoplastic (PVC, TPE, etc.), a polyurethane or alternatively a synthetic rubber of the EPDM type, or may be any other suitable flexible or soft plastic.

The molding 3 has been manufactured by implementing a manufacturing method known as "encapsulation" because it involves a step of molding the molding 3 in a molding device, between two molding elements, one molding element accommodating the interior face of the glazing and one molding element accommodating the exterior face of the glazing, these two molding elements being closed on one another during the molding step.

In FIG. 1, the molding 3 is positioned around the entire periphery of the glazing 1, but this molding could quite well be positioned only over part of the periphery of the glazing, or only over some part of the glazing. The face of the glazing that is visible in FIG. 1 is the exterior face of the glazing.

In order to improve the esthetic appearance of the glazing, a part of the molding 3 visible from outside the vehicle is concealed by a trim which in this instance is affixed only at the bottom part of the glazing, but which could just as well be affixed around the entire periphery of the glazing 1 and/or over some part of the glazing.

The attached component 2, which here is used as a trim, is made of a plastic that is a hard plastic within the meaning of the invention, and may for example be based on acrylonitrile-butadiene-styrene (ABS), acrylonitrile-butadiene-styrene-polycarbonate (ABS-PC), acrylonitrile-butadiene-styrene-polyamide (ABS-PA), polypropylene (PP), acrylonitrile-styrene-acrylate (ASA), polycarbonate (PC), polyamide (PA), etc., or any other suitable hard plastic. The attached component 2 is based on a plastic and may thus include fillers and notably mineral fillers such as glass fibers, or may be coated with one (or several) coat(s) or layer(s) and notably with a decorative layer on its front face.

The attached component 2 has a front face 20 which is the decorative face, seen from the outside; this front face may for example be coated with a coating that gives the appearance of a metal, particularly a chromium-plated metal.

The attached component 2 also has a rear face 21 which is oriented toward the inside. This rear face comprises fixing means for fixing the attached component directly to said glazing 1 (scenario C, by direct contact with the glazed element of the glazing) or for fixing indirectly to the glazing, via the molding 3 (scenario D).

The glazed element 5 of the glazing 1 may be a monolithic glazed element, that is to say one consisting of a single sheet of material, or may be a composite glazed element, that is to say one consisting of several sheets of material between which at least one adhesive interlayer, in the case of laminated glazings, or at least one intermediate space, in the case of multiple glazings (double glazings, triple glazings, etc.) is inserted. The sheet(s) of material may be inorganic, notably made of glass, or may be organic, notably made of plastic.

In the case of vehicle glazing, the glazing generally has, at least partially at its periphery, an ornamental strip M. This ornamental strip is generally the result of a depositing of enamel, performed on the interior face of the glazing or on an interlayer of the glazing in the case of composite glazings, but could just as well result from partial and/or peripheral coloration of a sheet of material used, particularly of a sheet of organic material.

According to the invention, in order to fix the attached component 2 made of plastic to the periphery of the glazing 1, on the one hand, appendages 22 are produced on the rear face 21 of the attached component and, on the other hand, holes 10 are produced beforehand either directly in the glazed element of the glazing (scenario C), or in the molding 3 (scenario D); to fix the attached component 2, the appendages are introduced into the holes 10, then the distal end of each appendage which protrudes beyond the holes is deformed by temporary softening to come into contact with the rear face of the glazed element at the periphery of the corresponding hole 10 in which the appendage is housed (scenario C), or with the rear face 31 of the molding 3 at the periphery of the corresponding hole 10 in which the appendage is housed (scenario D).

In order to be able to introduce the appendages 22 into the holes 10, it is necessary for each hole 10 to be open at its two ends on two opposite faces of said glazed element of the glazing 1 (scenario C) or of said molding 3 (scenario D):

scenario C: either the hole 10 opens at its proximal end 14, the one closest to the rear face 21 of the attached component, onto the front face of the glazed element (which so happens to be the face facing toward the outside) and opens at its distal end 13 onto the rear face of the glazed element (which so happens to be the face facing toward the inside);

scenario D: or the hole 10 opens at its proximal end 14, which is the end closest to the rear face 21 of the attached component, onto the front face 30 of the molding 3 (which so happens to be the face facing toward the outside) and opens at its distal end 13 onto the rear face 31 of the molding 3 (which so happens to be the face facing toward the inside).

The holes 10 are produced beforehand because they are present in the glazing (scenario C) or in the molding (scenario D) before the appendage is inserted therein; they are preferably produced at the time of manufacture of the glazing or of the molding respectively. In the case of a glazed element made of glass, the holes are pierced after the sheet of glass has been manufactured but before the appendages are introduced.

These holes 10 may have a circular or oblong interior section 15. Because the element in which they are manufactured is generally itself manufactured by molding, the holes need to be easy to release from the mold. These holes 10 also have an axis A.

In order to be able to perform the heading operation, that is to say the deformation of the distal end 23 of the appendages 22 by temporary softening, the distal end 23 of each appendage 22 protrudes beyond the rear face delimiting the periphery of the hole 10 in the glazed element (scenario C) or in the molding 3 (scenario D).

The heading operation is preferably performed by applying ultrasound in the frequency range from 25 to 70 kHz and, for preference, in the frequency range from 30 to 35 kHz.

The appendages 22 are generally formed as an integral part of the main part of the attached component, that is to say that the entire attached component, including its appendages, is manufactured together by molding; however, it is not excluded for the appendages to be themselves manufactured independently of the main part of the attached component and then attached, for example by bonding, against the rear face 21 of the attached component.

The heading operation is preferably performed around the entire periphery of each hole, that is to say that the distal end 23 of the appendages 22 is deformed around its entire periphery so that the material of the distal end after deformation is present around the entire periphery of each hole 10.

According to one particular aspect of the invention, the attached component is fixed to the periphery of the glazing only by the appendages headed at their distal ends that protrude beyond the holes in the glazed element (scenario C) or in the molding 3 (scenario D).

For simplicity, in the remainder of the description, reference is made only to scenario D, the one in which the attached component is fixed indirectly to the glazing by positioning the appendages in holes 10 created in the molding, but it should be understood that the holes 10 could just as well be created directly in the glazed element (scenario C).

When the attached component is manufactured by molding, the main part, situated between the front face and the rear face of this attached component, does not necessarily have the same thickness along its entire length. It is thus possible for the main part to be thicker at the places where it experiences the most intense stresses and thinner at points subject to less stress.

The interior section 15 of each hole 10, at least at its distal end 13, is substantially identical to (or even slightly smaller than, in scenario D of a hole in the molding 3) the exterior section 25 of said appendage 22 near this distal end 13 of the hole 10.

It is also possible that, over a portion measuring a few millimeters (1 to 5 mm), the interior section 15 of each hole 10 is substantially identical to (or even slightly smaller than, in scenario D of a hole in the molding 3) the exterior section 25 of said appendage 22 over the entire depth p of said hole 10.

The appendage 22 (and preferably each appendage of the attached component) may, in cross section with respect to its axis B, have an exterior section 25 which may be circular, oval, rectangular or square. The hole 10 which accommodates this appendage (and preferably each hole accommodating an appendage like it) preferably has an interior section 15 that is respectively circular, oval, rectangular or square, identical to the exterior section 25 of the appendage 22.

Figure 2:
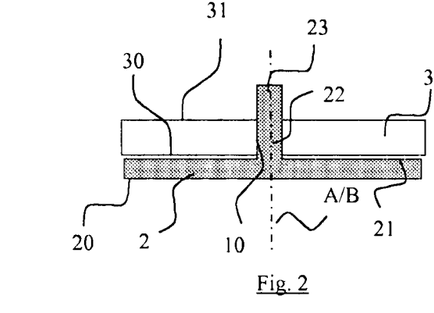
FIGS. 2 and 3 illustrate a view in axial section of a solid cylindrical appendage respectively before and after it is deformed by temporary softening.

FIG. 2 illustrates a simple appendage 22 of solid circular cross section which extends substantially perpendicular to the rear face 21 of the attached component 2 at the periphery of the appendage. The appendage has just been positioned in the hole 10 created prior to the introduction of the appendage and the axis B of the appendage coincides with the axis A of the hole 10.

However, it is possible to produce one (or several) of the appendages of the attached component such that after positioning in the hole 10 the axis B of the appendage does not coincide with the axis A of the hole 10 if the hole is of a cross section larger than the cross section of the appendage and provided, however, that at least one appendage of the attached component is such that after positioning in the hole 10 the axis B of the appendage does coincide with the axis A of the hole 10. This option has not been illustrated here.

Figure 3:
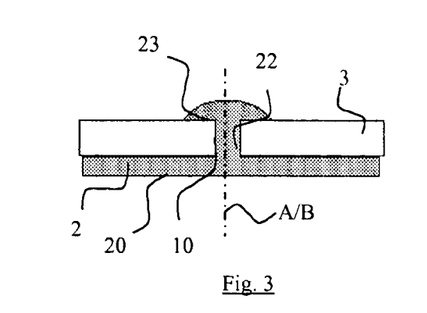

FIG. 3 illustrates the distal end 23 of the appendage 22 after the heading operation. Because the softened material has been contained by a hemispherical counter-mold, the headed distal end 23 has a hemispherical shape (represents half a sphere or less than half a sphere).

As may be seen by comparing FIGS. 2 and 3, the formation of the head has had the effect of pulling the rear face 21 of the attached component 2 closer toward the front face 30 of the molding 3. The appendage 22 therefore finds itself under light tensile internal stress between the headed distal end 23 and the rear face 21 and the molding 3 therefore finds itself under slight compressive internal stress between its exterior face 30 in contact with the rear face 21 and its interior face 31 in contact with the headed distal end 23.

This effect is also obtained when the appendage 22 is introduced into a hole created directly in a glazed element (scenario C) and when the distal end 23 is headed directly onto a rear face of the pierced glazed element.

The attached component 2 is fixed to the glazing before the glazing is fixed into the bodywork opening. The bodywork 4 is illustrated in FIG. 5 to show that the distal end 23 does not impede the fixing of the glazing into the bodywork opening.

Figure 4:
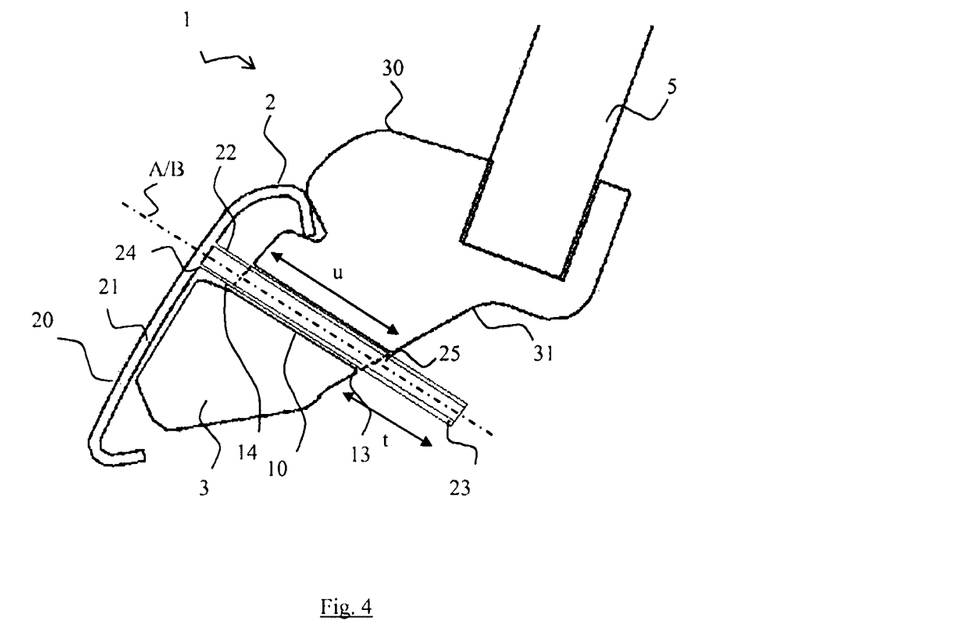
FIG. 4 illustrates a view in section along the bottom edge of the glazing of FIG. 1 before the trim is fixed to the molding.

In the version illustrated in FIG. 4, the length t of the distal end 23 prior to heading is of the order of 4 mm and the depth u of said hole 10, from its proximal end to its distal end, is at least 2 mm (here 6 mm).

In order to be able to introduce all the appendages of the attached component into all the corresponding holes, the holes 10 are coaxial: they all have an axis and all the axes of the holes 10 are parallel in space.

Figure 5:
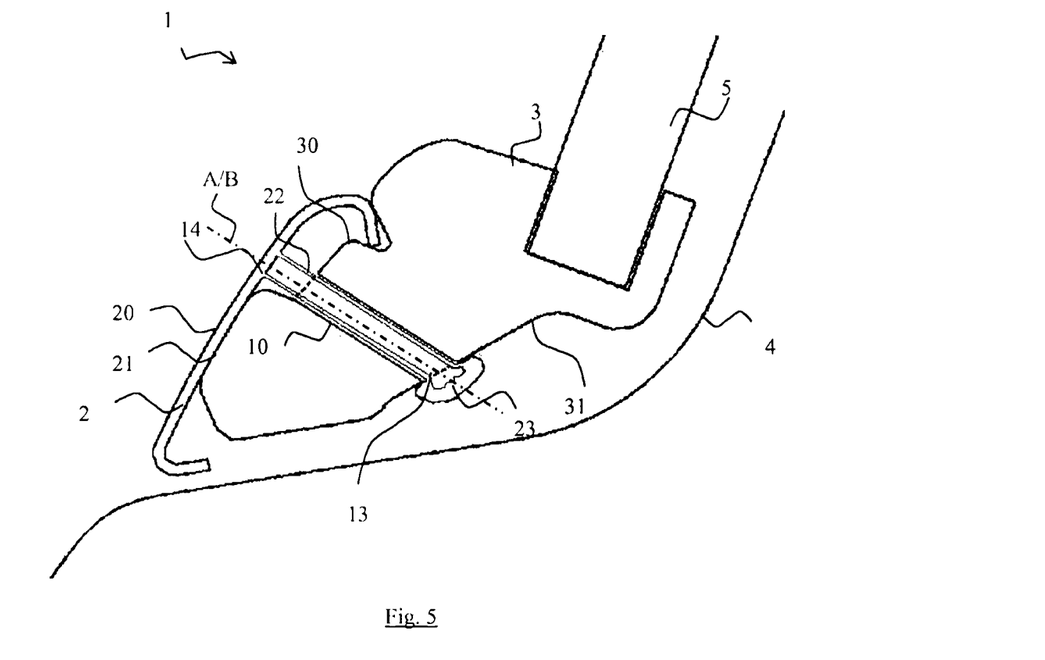
FIG. 5 illustrates a view in section along the bottom edge of the glazing of FIG. 1 after the trim has been fixed to the molding.

This is relatively easy for this variant of FIGS. 4 and 5, because the appendages 22 are each oriented along an axis B substantially perpendicular to the rear face 21 of the attached component 2.

The situation may be more complicated when the axes A of the holes are not perpendicular to the rear face 21 of the attached component 2 and all make the same angle with respect to the rear face 21 of the attached component 2.

The situation may be more complicated still when the axes A of the holes are not all at the same angle with respect to the rear face 21 of the attached component 2.

Figure 6:
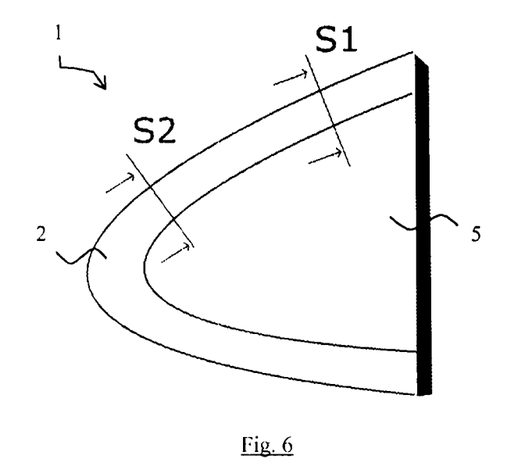
FIG. 6 illustrates a perspective view of a vehicle rear right fixed glazing having a trim fixed to the molding, the glazing being sectioned in the front part.
Figure 7:
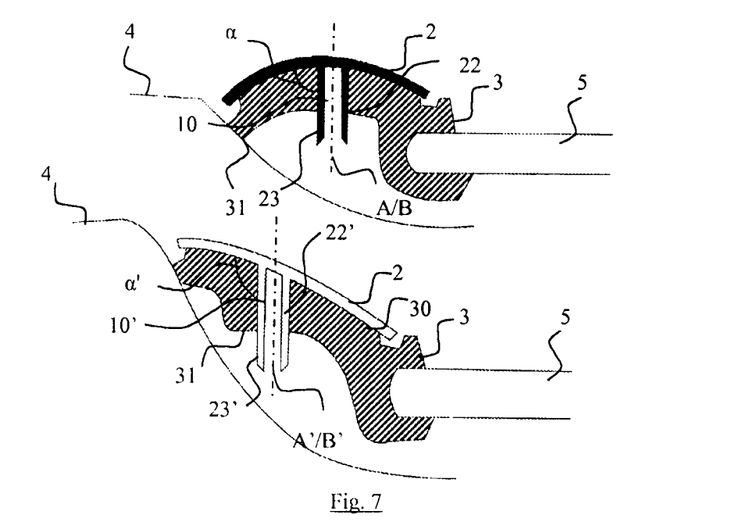
FIG. 7 illustrates sections on S1 and S2 of FIG. 6.
Figure 8:
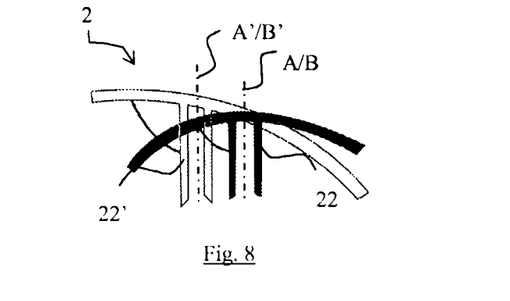
FIG. 8 illustrates a side view of the two sections S1 and S2 of the attached component of FIG. 6 placed side-by-side.

This is particularly visible in conjunction with the variant of the invention illustrated in FIGS. 6 to 8.

In this variant of the invention, the attached component is of a complex non-flat shape: the attached component 2 makes an angle α between an axis B of an appendage 22 and the rear face 21 of said attached component 2 at the location on the appendage 22 which differs from the angle α' between an axis B' of another appendage 22' and the rear face 21 of said attached component 2 at the location of this other appendage 22'.

In FIG. 7, the head has not yet been formed.

During implementation of this variant, whatever the orientation of the axes A, A' of the holes 10, 10' in space with respect to the rear face 21 of the attached component 2, the direction in which the appendages 22 are introduced into the holes 10 is the direction of the axes A, A', which are parallel in space; the axes B, B' are also parallel in space and coincide with the axes of the holes once the appendages have been introduced into the holes.

In this case, the direction in which the source of softening is applied is preferably the direction of the axes A.

Figure 9:
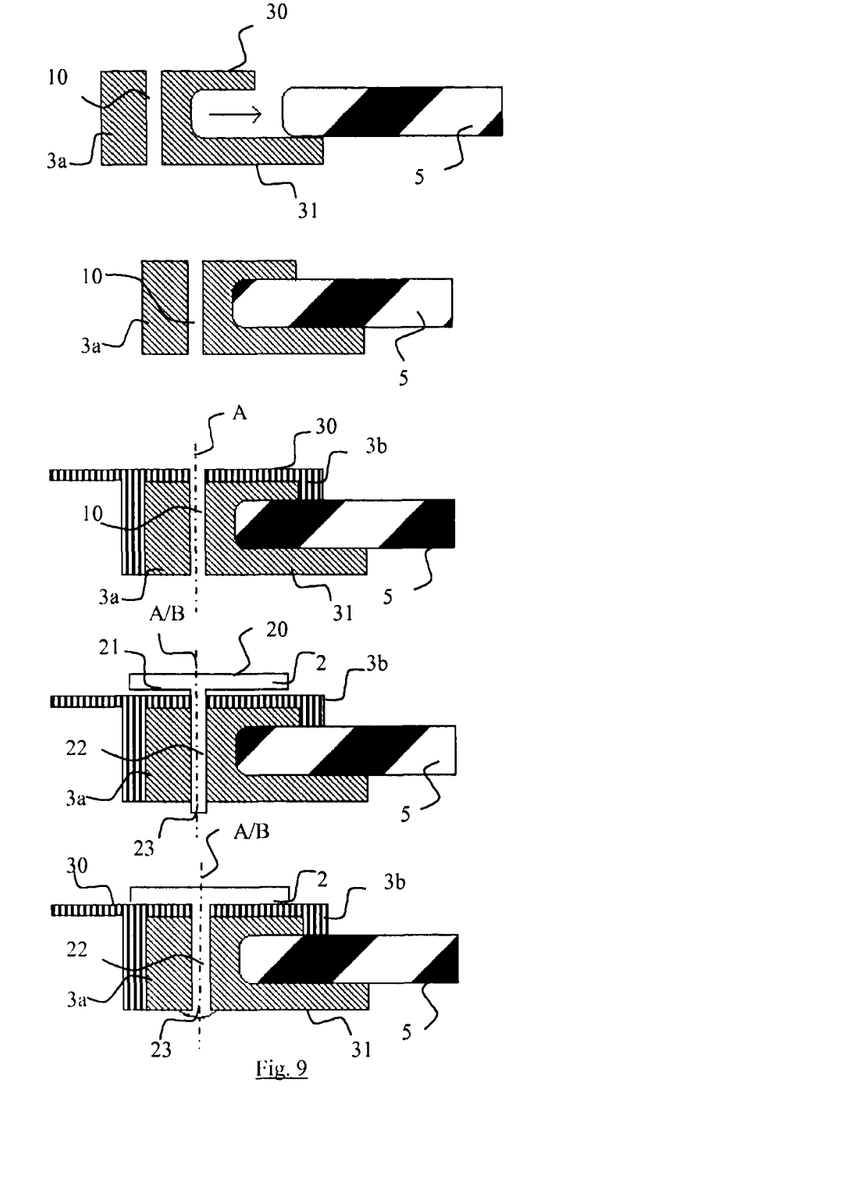
FIG. 9 illustrates another embodiment of the invention.

In the variant illustrated in FIG. 9, the molding 3 is in two parts which are not manufactured simultaneously.

A first part 3a of the molding 3 is not manufactured by encapsulation on the glazing but is prefabricated and has a recess that accommodates the edge of the glazing (top figure); thus, the entire periphery of the glazing is inserted into the recess in the molding (2" figure from the top).

This first part 3a comprises part of the holes 10, just one of which has been depicted here.

It might be possible for the attached component to be positioned in such a way that the appendages enter the holes, and then for the distal ends of the appendages to be temporarily softened to form the ends.

However, in this instance, a second part 3b of the molding 3 is positioned against the exterior face of the first part 3a of the molding in order to increase the distance between the interior face 31 of the complete molding (consisting of the first part 3a and the second part 3b) and the exterior face 30 thereof (3$^{rd}$ drawing from the top).

This second part 3b may further make it possible to produce a base against which the attached component can bear. It also has holes for the passage of the appendages. It may be made of a material that is even softer still than the first part 3a.

It is thus possible to combine two materials with different properties to suit the requirements, on the one hand, for the first part 3a of the molding 3 made of soft plastic and, on the other hand, for the second part 3b of the molding 3 made of soft plastic.

Next (4$^{th}$ drawing from the top), the attached component is positioned on the second part 3b so that the appendages penetrate the holes, then the distal ends of the appendages are temporarily softened to form the heads (5$^{th}$ drawing from the top).

In this configuration, as can be seen in the drawings of FIG. 9, the appendage 22 is solid and extends substantially at right angles to the rear face 21 of said attached component 2.

Also in this configuration, as visible in the drawings of FIG. 9, the rear face 31 of the molding (although that could just as well be the rear face of the glazing itself) is substantially parallel to the rear face 21 of said attached component 2, at least at the periphery of the hole 10 (and is preferably substantially parallel to the rear face 21 at the periphery of each hole).

In this variant of FIG. 9, it is possible for the first part 3a to be manufactured by encapsulation and for the second part 3b too to be manufactured subsequently by encapsulation.

In this configuration also, the molding finds itself in compression between the rear face of the attached component and the softened distal end of the appendage.

Figure 10:
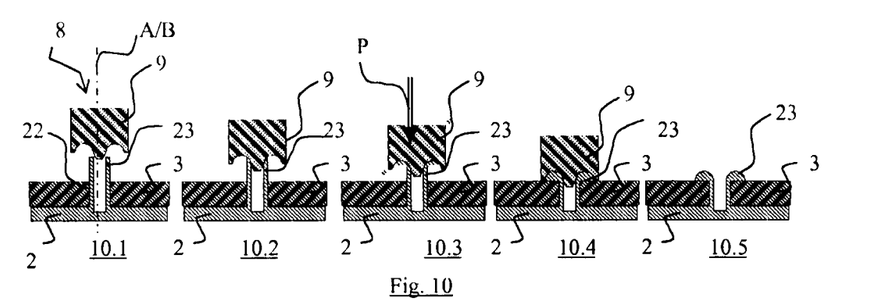
FIG. 10 illustrates the temporary softening of a distal end of a hollow appendage, in five steps.

FIG. 10 illustrates a device 8 for implementing the method according to the invention and how to implement it.

This device comprises a source of softening 9, which is an ultrasound source, the same one for all the appendages. The operating frequency of the source is 35 kHz and the power of the generator is 400 W.

The attached component in this instance is made of ABS-PC with a hardness of 80 Shore D. The appendage 22 is tubular, with a constant section over its entire length, an external diameter of 6 mm and a wall thickness of 1 mm. The distal end is 4 mm long prior to softening. The plastic of the molding is a polyurethane with a Shore A hardness of 60.

Drawing 10.1 illustrates the source of ultrasound approaching the distal end 23.

Drawing 10.2 illustrates contact between the source of ultrasound and the distal end 23.

Drawing 10.3 illustrates the start of the temporary softening of the distal end 23 under the effect of the ultrasound.

Drawing 10.4 illustrates the end of the temporary softening of the distal end 23 under the effect of the ultrasound.

Drawing 10.5 illustrates the distal end 23 after the heading operation, that is to say after the temporary softening and the hardening of the material of the distal end. The deformation of the distal end 23 once the source of softening 9 has been removed is permanent.

These drawings also show that, in the scenario illustrated, the softened material has been contained by a counter-mold made of metal; this counter-mold has generated a headed distal end 23 in the form of a hemisphere with a circular hole at its center. This counter-mold has been applied to the distal end for a period of 4 to 5 seconds in order to achieve the softening visible in drawing 10.5.

In another version of the invention, the device 8 comprises several sources of softening which are implemented simultaneously to head all the distal ends of one attached component at the same time.

The direction P in which the source of softening is applied is preferably the direction of the axis B of the appendage for each appendage.

Figure 11:
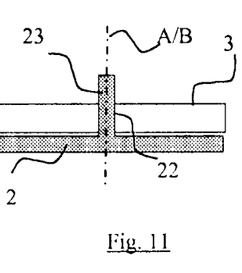
FIGS. 11 and 12 respectively illustrate a view in section and a perspective view of an elongate appendage before it is deformed by temporary softening.
Figure 12:
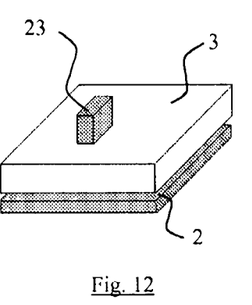

FIGS. 11 and 12 illustrate a variant whereby said attached component 2 is of elongate shape and an appendage 22 also has an elongate section which extends in the elongate direction of said attached component. For preference in this scenario, all the appendages of the attached component have an elongate section which extends in the elongate direction of said attached component.

In this variant, the distal end 23 of the appendage 22 is thus headed in the elongate direction.

Figure 13:
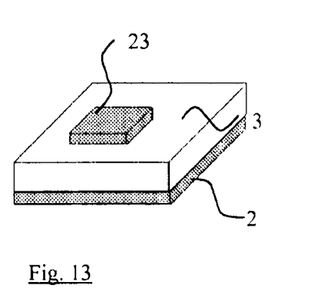
FIG. 13 illustrates a perspective view of the appendage of FIGS. 11 and 12 after it has been deformed by temporary softening.

FIG. 13 illustrates the distal end 23 of the appendage 22 which is of square section after the heading operation.

Figure 14:
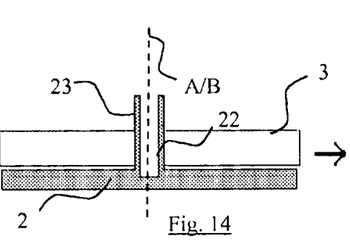
FIG. 14 illustrates a view in cross section of a tubular appendage before it is deformed by temporary softening.

FIG. 14 illustrates a variant in which the appendage 22 (and preferably each appendage of the attached component) has a square section.

In this variant, the exterior section 25 of the appendage may be circular, oval, rectangular or square. The hole 10 that accommodates this appendage (and preferably each hole accommodating an appendage like it) has an interior section 15 that is respectively similar to the exterior section 25 of the appendage 22.

Figure 15:
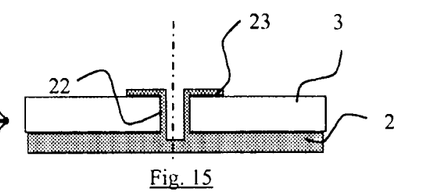
FIGS. 15 and 16 illustrate two possible deformations of the appendage of FIG. 14, with mechanical pressure applied and without the application of such pressure, respectively.

FIG. 15 illustrates a first embodiment variant of the headed distal end 23: mechanical pressure has been applied to said distal end 23 at least for part of the softening time (and here for the entire duration of the softening); this mechanical pressure has caused the headed distal end 23 to become flattened.

Figure 16:
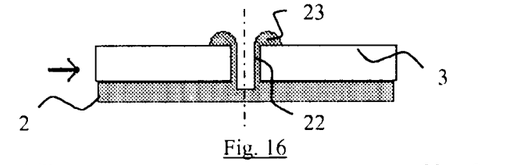

FIG. 16 illustrates a second embodiment variant of the headed distal end 23 of FIG. 14: no mechanical pressure has been applied to said distal end 23 for part of the softening time; however, the softened material has been contained by a counter-mold, as in the scenario of FIG. 2; this counter-mold has generated a headed distal end 23 in the form of a hemisphere with a circular hole in its center.

Figure 17:
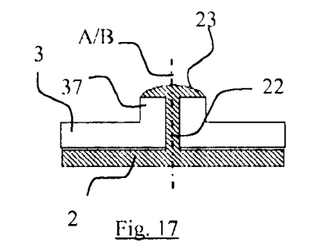
FIGS. 17 to 19 illustrate three alternative forms of embodiment of the distal end of the hole.

FIG. 17 illustrates a variant whereby the distal end 13 of one hole 10 (and preferably of each hole 10 of the molding or of the glazing) has, over at least part of its periphery (and preferably over its entire periphery), a boss 37 projecting from the rear face 31 of said glazing or of said molding at the periphery of the hole 10. This boss may, for example, have a thickness of between approximately one fifth and one times the thickness of the glazing or of the molding at the periphery of the hole 10.

In this variant, the distal end 23 of the appendage 22 is thus headed against an additional thickness of the molding or of the glazing itself, making it possible to reduce the risk of the molding or of the glazing itself rupturing around the hole 10.

Figure 18:
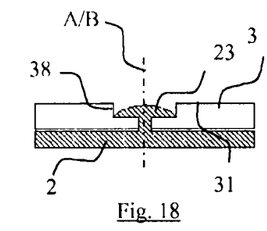

FIG. 18 illustrates a variant whereby the distal end 13 of a hole 10 (and preferably of each hole 10 of the molding or of the glazing) has, over at least part of its periphery (and preferably over its entire periphery), a depression 38 set back from the rear face 31 of said glazing or of said molding at the periphery of the hole 10. This depression may, for example, be of a thickness comprised between about a half and one fifth of the thickness of the glazing or of the molding at the periphery of the hole 10.

In this variant, the distal end 23 of the appendage 22 is thus headed into a recess and protrudes little if at all beyond the rear face of the molding or of the glazing at the periphery of the hole 10. That then limits the bulk of the distal end projecting from the hole 10.

Figure 19:
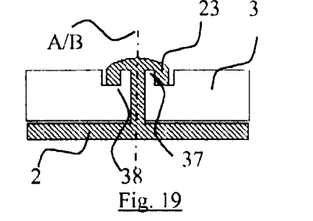

FIG. 19 illustrates a variant which is a combination of the preceding two variants: the distal end 13 of one hole 10 (and preferably of each hole 10 of the molding or of the glazing) has, over at least part of its periphery (and preferably over its entire periphery), both a boss 37 and a depression 38. This boss and this depression may have the same thickness. This boss and this depression are preferably coaxial, the boss being closer to the axis A of the hole than the depression.

In this variant, the distal end 23 of the appendage 22 has, in longitudinal section (along the axis B), the shape of a mushroom. The distal end 23 of the appendage 22 is thus headed against an additional thickness of the molding or of the glazing itself while at the same time being partially recessed with respect to the rear face of the molding or of the glazing. The fixing is thus firm, as in the case of the variant of FIG. 17, while at the same time limiting the bulk as in the case of the variant of FIG. 18.

The present invention has been described in the foregoing by way of example. Of course a person skilled in the art will be able to carry out different variants of the invention without thereby departing from the scope of the patent as defined by the claims.

The invention claimed is:

1. A glazing, comprising:
   a glazing; and
   an attached component including plastic, the attached component being fixed indirectly to the glazing via a portion of a molding fixed to a periphery of the glazing, the attached component having a rear face including fixing means for fixing the attached component indirectly to the glazing,
   wherein the fixing means includes a plurality of appendages, each of the appendages protruding from the rear face and having a distal end which enters a hole in the molding, each hole being open at opposing ends thereof on two opposite faces of the molding, and the distal end of each appendage projecting beyond a rear face of the molding delimiting the hole,
   wherein the distal end of each appendage is deformed by one of softening and application of ultrasound, so as to contact the rear face of the molding at a periphery of the hole or around an entire periphery of the hole,
   wherein the molding includes a first part and a second part made of a material that is softer than the first part, each hole extending through the first and second parts, the first part including the portion fixed to the periphery of the glazing, the second part being positioned against an exterior face of the first part.

2. The glazing as claimed in claim 1, wherein a plurality of holes is oriented in the molding along axes that are parallel in space.

3. The glazing as claimed in claim 1, wherein the appendages of the plurality of appendages are oriented on the attached component along axes that are parallel in space.

4. The glazing as claimed in claim 1, wherein the appendages of the plurality of appendages are each oriented on the attached component along axes that are substantially perpendicular to the rear face of the attached component.

5. The glazing as claimed in claim 1, wherein the attached component has a non-flat shape with an angle between an axis of a first appendage and the rear face of the attached component at a point on the appendage that differs from an angle between an axis of a second appendage and the rear face of the attached component at the second appendage.

6. The glazing as claimed in claim 1, wherein at least one appendage has a hollow cross section that is one of circular, oval, rectangular, and square, and
   wherein a cross section of the hole is correspondingly shaped like the cross section of the appendage.

7. The glazing as claimed in claim 1, wherein an interior section of the hole, at least at a distal end thereof, is substantially identical to an exterior section of the appendage near a corresponding end.

8. The glazing as claimed in claim 1, wherein a front face of the molding is substantially parallel to the rear face of the attached component, at least at a periphery of the hole.

9. The glazing as claimed in claim 1, wherein a rear face of the molding at the hole is perpendicular to one or both of an axis of the hole and an axis of a corresponding appendage.

10. The glazing as claimed in claim 1, wherein the attached component has an elongate shape.

11. The glazing as claimed in claim 1, wherein a distal end of the hole comprises, over at least part of a periphery thereof, a boss projecting with respect to the rear face of the molding at the periphery of the hole.

12. The glazing as claimed in claim 1, wherein a distal end of the hole comprises, over at least part of a periphery thereof, a depression set back from the rear face of the molding at the periphery of the hole.

13. The glazing as claimed in claim 1, wherein an appendage of the plurality of appendages has an elongate section extending in an elongate direction of the attached component.

14. The glazing as claimed in claim 1, wherein an appendage of the plurality of appendages is formed integrally with the attached component.

15. The glazing as claimed in claim 1, wherein an appendage of the plurality of appendages is attached by bonding against the rear face of the attached component.

* * * * *